United States Patent [19]
Broyles

[11] Patent Number: 5,879,734
[45] Date of Patent: Mar. 9, 1999

[54] NUT SHELLER BYPASS METHOD

[76] Inventor: David J. Broyles, Rte. D, Box 537, Lamesa, Tex. 79331

[21] Appl. No.: 963,733

[22] Filed: Nov. 4, 1997

[51] Int. Cl.$^6$ ........................................................ A23L 1/00
[52] U.S. Cl. .............................. 426/481; 426/482; 99/569
[58] Field of Search ..................................... 426/481, 482, 426/483, 632; 94/569

[56] References Cited

U.S. PATENT DOCUMENTS

| | | | |
|---|---|---|---|
| 853,066 | 5/1907 | Crellin | 99/569 |
| 1,564,914 | 12/1925 | Vaughn . | |
| 1,594,702 | 8/1926 | Williams . | |
| 2,265,588 | 12/1941 | Walker | 146/8 |
| 2,279,987 | 4/1942 | Guerra | 146/8 |
| 2,319,757 | 5/1943 | Vigneau | 99/569 |
| 2,504,374 | 4/1950 | Baldwin | 46/11 |
| 2,506,848 | 5/1950 | Turner | 146/11 |
| 4,347,260 | 8/1982 | Crompton | 426/483 |
| 5,467,700 | 11/1995 | Dowell et al. | 99/570 |

*Primary Examiner*—Anthony J. Weier
*Attorney, Agent, or Firm*—Wendell Coffee; Mark E. Scott

[57] ABSTRACT

In a plant for mass mechanical shelling of nuts having a cracker, sheller, and air separators, this process bypasses the sheller with some cracked nuts. Nuts and nut parts created in the cracker are sent to bypass structure where in successive operations, the nuts are separated by width then by thickness. Those nuts having the largest width are shelled by parallel rubber coated cylinders. The remaining nut parts having smaller thickness/width ratios bypass the sheller of the prior art. Parts having larger thickness/width ratios are sent to the sheller of the prior art. The process is performed by screens which separate the cracked nut parts by width. For each width of nut parts, slots between revolving cylinders, separate the larger thickness parts from the smaller thickness parts.

9 Claims, 6 Drawing Sheets

NUT SHELLER BYPASS METHOD

CROSS REFERENCE TO RELATED APPLICATION

None, however, Applicant filed Disclosure Document Number 412574 on Feb. 20, 1997 which document concerns this application; therefore, by separate paper it is respectfully requested that the document be retained and acknowledgment thereof made by the Examiner. (MoPEP 1706)

BACKGROUND OF THE INVENTION (1) Field of the Invention

This invention relates to the shelling of pecans. Operators of pecan shelling operations have ordinary skill in this art.

(2) Description of the Related Art

The state of the art for mass mechanical shelling of pecans comprises many steps. Pecans are initially harvested from an individual orchard and delivered to a pecan shelling facility.

A pecan shelling facility is schematically shown in FIG. 7. Normally the pecans from an orchard will be of a single variety. At the pecan shelling facility, the pecans are first separated by a sizer 80. Sizing pecans from an orchard involves separating by thickness. Since the ratio of a pecan's thickness to its length and width is substantially constant for a particular pecan variety, separating by thickness is sufficient to group pecans of substantially the same thickness, width, and length. Pecan sizes are numbered in accordance with their thickness in sixteenths of an inch, e.g. a group of pecans with a thickness of $^{13}\!/_{16}$" are size 13 pecans.

The next step in the shelling process involves feeding pecans of a particular size range to a cracker 82. Having the pecans separated by sizes allows for optimal performance of the cracker.

After the pecans are cracked according to standard practice before this invention, everything that comes out of the cracker is called cracker product 84. The cracker product (including whole uncracked pecans) is fed to a plant sheller 86. The sheller, as the name implies, further releases or frees any of the woody outer shell from the meat product therein.

The output of the sheller is then fed to a series of screens 88. The screens separate the sheller product by width, and each width range is fed individually to air separators. In the air separation process, meat from the pecan is separated from any of the woody shell by operation of the lighter shell pieces moving with air.

The meat is separated into different batches for use. In order of value, these will be halves, extra large pieces, large pieces, medium, and smalls and midgets. The air separator will generally be identified as halve separator 90, extra large separator 92, large separator 94, and medium, small, and midget separator units 96.

As described above, the sized pecans are fed to a cracker. When pecans leave the cracker, 25%–50% of the meats halves are completely separated from the shells. When a portion of the shell remains attached to the meat it is referred to as a "sticktight". When the meat is entirely free from the shell it is referred to as "sticktight free"; therefore, after cracking, 25%–50% of the meat from the pecans will be sticktight free. According to present practice all of the cracked pecans, even those that are sticktight free, are fed to the sheller. The sheller's main purpose is to remove the woody shell portion from sticktights; therefore, feeding the sticktight free meat halves to the sheller often breaks the sticktight free meat halves thereby reducing their value.

SUMMARY OF THE INVENTION (1) Progressive Contribution to the Art

The invention herein describes an improved process, and related structure, for increasing the efficiency of the shelling process as well as decreasing the loss of value caused by damaging sticktight free meat.

This invention describes a process and structure to separate the sticktight free meat (both halves and parts) from the sticktights and thereby by-pass the sheller with those portions of the pecan meat that are sticktight free after cracking alone. This by-pass increases efficiency by reducing the amount of meat loss in the process by not sending the sticktight free meat to the sheller where it is further broken.

This invention also describes a unique method and structure for quickly shelling substantially whole cracked pecans. The result is achieved by passing the substantially whole partially cracked pecans through the slot formed between a pair of rubber coated cylinders. The slot formed therein is slightly smaller than the whole uncracked pecans, and therefore as the whole uncracked pecans move through the slot. In combination with the elastic property of the rubber, the shell of partially cracked nuts is further broken from the meat.

(2) Objects of this Invention

An object of this invention is to increase the output of pecan halves and large pieces from a shelling plant.

Another object of this invention is to separate sticktight free meat, in various sizes, from the remaining cracker product such that the separated meat portions are not processed through the sheller.

Another object of this invention is to separate out whole, uncracked pecans and route those whole uncracked pecans back to the cracker.

Yet another object of this invention is to quickly shell substantially whole cracked pecans and separate the sticktight free meat halves therefrom before passing the remainder to the sheller.

Further objects are to achieve the above with devices that are sturdy, compact, durable, lightweight, simple, safe, efficient, versatile, ecologically compatible, energy conserving, and reliable, yet inexpensive and easy to manufacture, install, operate, and maintain.

Other objects are to achieve the above with a method that is rapid, versatile, ecologically compatible, energy conserving, efficient, and inexpensive, and does not require highly skilled people to install, operate, and maintain.

The specific nature of the invention, as well as other objects, uses, and advantages thereof, will clearly appear from the following description and from the accompanying drawings, the different views of which are not necessarily scale drawings.

CATALOGUE OF ELEMENTS

Figure 1:
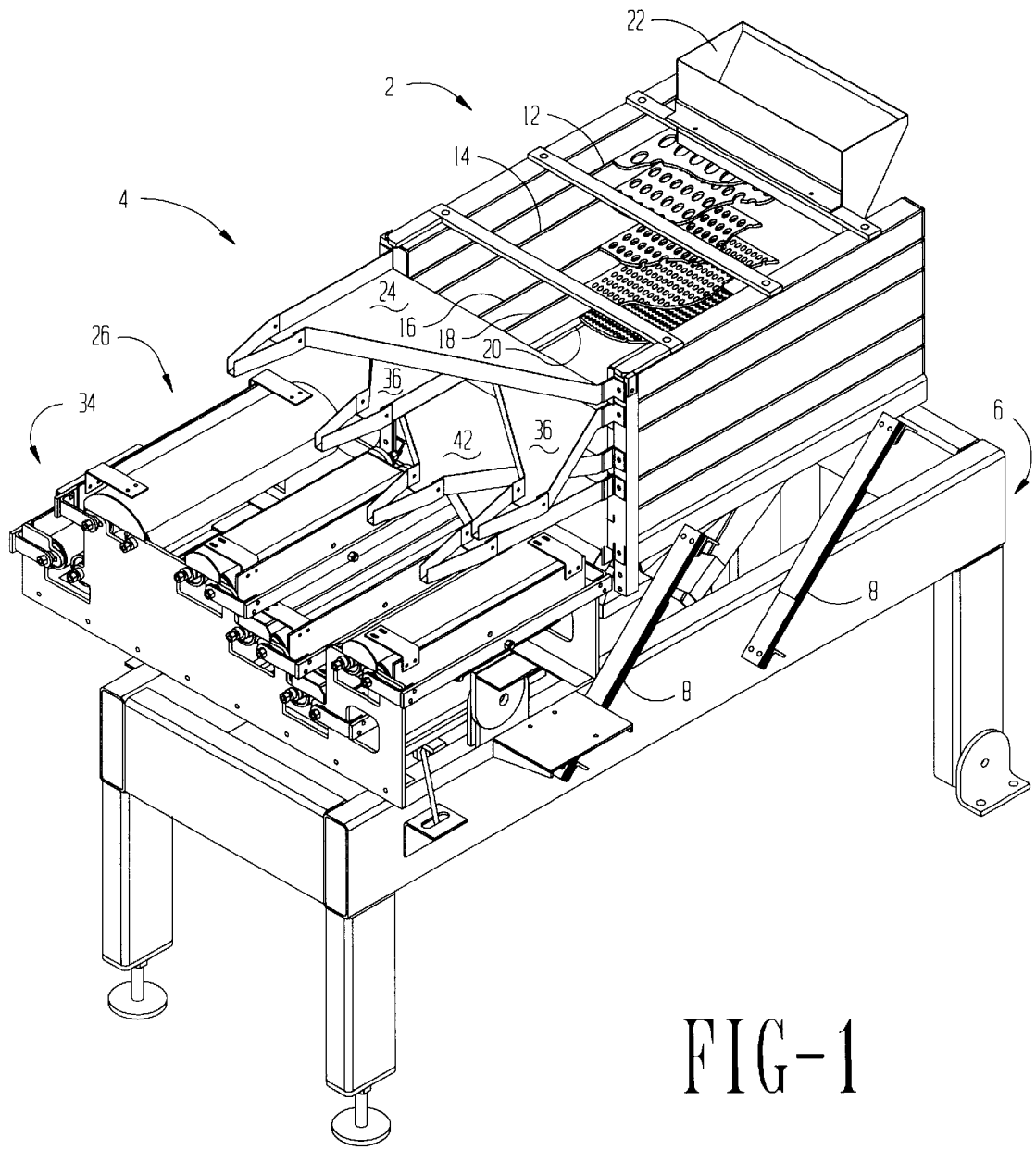
FIG. 1 is a perspective view of an entire machine according to this invention from above the sheller end looking down toward the feed end.

As an aid to correlating the terms of the claims to the exemplary drawing(s), the following catalog of elements and steps is provided:

2 screen assembly
            4 thickness separating assembly
            6 frame
            8 leaf springs
            1o vibrating motor
            12 level one screen
            14 level two screen
            16 level three screen
            18 level four screen
            20 level five screen
            22 chute
            24 level one chute
            26 shelling-separation portion
            28 rubber coated cylinder
            30 level one slot
            32 cylinders
            34 product end
            35 pan
            36 level two chute
            38 level two slot
            40 cylinders
            42 level three chute
            44 level three slot
            46 cylinders
            48 level four chute
            50 level four slot
            52 cylinders
            54 level five chute
            56 pan for roller 28
            58 pan for slot 38
            60 pan for slot 30
            62 pan for slot 44
            64 pan for slot 50
            66 axis
            80 sizer
            82 cracker
            84 cracker product
            86 sheller
            88 screens
                AIR SEPARATOR 90 pecan halves
            92 extra large
            94 large
            96 medium
            96 small
            96 midget

DESCRIPTION OF THE PREFERRED EMBODIMENTS

The preferred embodiment of the by-pass comprises three main elements: 1) screen assembly 2; 2) thickness separating assembly 4; and 3) frame 6.

The function of frame 6 is simply to support the other two main elements; namely, the screen assembly 2 and the thickness separating assembly 4.

The screen assembly 2 is mounted to the frame 6 by way of four leaf springs 8. The flexing of the leaf springs 8 produces vibratory movement of the screen assembly 2 at substantially 45° angles to the frame 6. The screen assembly 2 separates the product by width.

Figure 2:
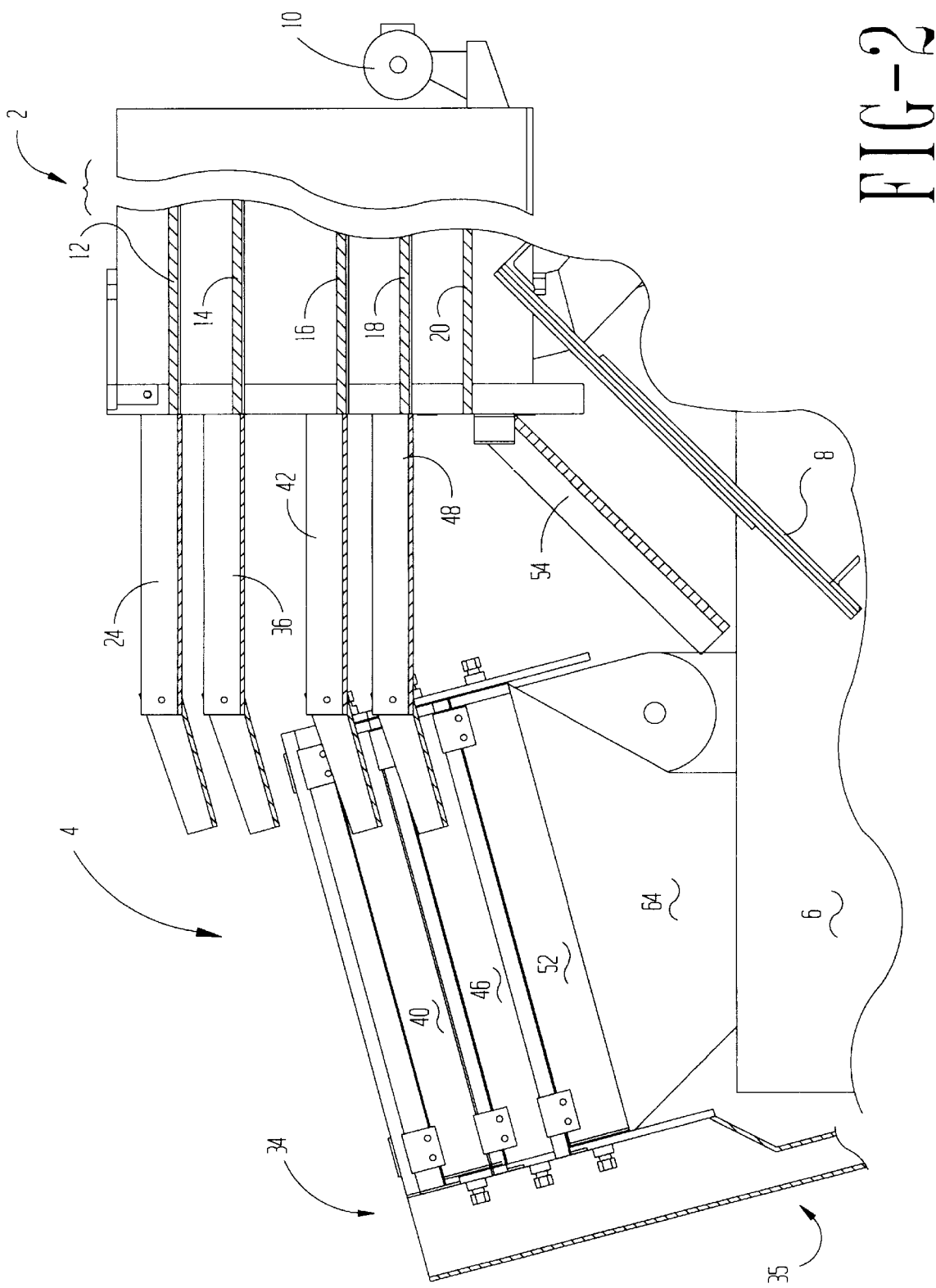
FIG. 2 is a side sectional view of the machine of FIG. 1, as seen from line 2—2 of FIG. 4 with the feed end to the right and the sheller end to the left. Stated otherwise if one were looking from the sheller end it would be the right side of the machine.
Figure 5:
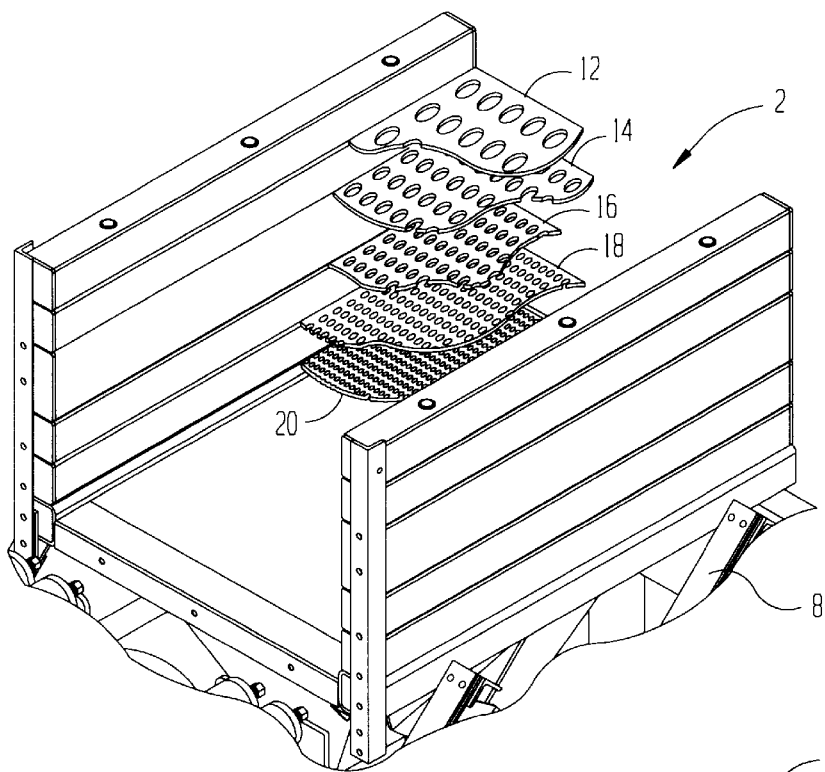
FIG. 5 is an enlarged perspective view of the screen assembly of FIG. 1.

Vibrating motor 10 on the screen assembly 2 shakes the screen assembly 2.(FIG. 2)

Screen assembly 2 contains five screens of circular holes. The screens are the level one or uppermost screen 12, the level two screen 14, the level three screen 16, the level four screen 18, and the level five screen 20.

Cracker product 84, which comprises the pecan parts created in the cracking process, is fed to the screen assembly 2 through chute 22 at the feed end of the bypass. Chute 22 directs the cracker product to the level one screen 12. The level one screen 12 is formed by circular holes. By applying the cracker product to the level one screen 12 through chute 22, the pecan parts of the cracker product are effectively separated by width. Those pecan parts with widths smaller than the diameter of the holes forming a level one screen 12 pass through the screen. Those pecan parts whose widths are too large to pass through the level one screen 12 are forced toward the thickness separating assembly 4 by operation of the vibrating motor 10 creating oscillation in the screen assembly 2 as allowed by flexing of the leaf springs 8.

The hole diameter of the level one screen 12 is selected, according to pecan size, to not pass whole uncracked pecans, substantially whole cracked pecans or large sticktights. It will be understood that the size of the holes in the level one screen 12, and the remaining screens, will be adjusted according to the relative size of the pecans being shelled.

Pecan parts forced toward the thickness separating assembly 4 by operation of the oscillation of the screen assembly 2 are forced onto the level one chute 24. The level one chute 24, still by operation of oscillation of the width separating assembly 2, directs those pecan parts that could not fall through the level one screen 12 holes to the thickness separating assembly 4. More specifically, the level one chute 24 directs these pecan parts to shelling-separating portion 26 of the thickness separating assembly 4.

Pecan parts entering the shelling-separation portion 26 of the thickness separating assembly 4 are fed to a pair of rubber coated parallel cylinders 28. These rubber coated cylinders 28 are rotating with respect to each other such that the direction of rotation as measured between them is substantially along the pull of gravity. These rubber coated cylinders are spaced to be slightly smaller than the thickness of the thickness range of pecans being shelled. Again, it will be understood that the spacing of the rubber coated cylinders 28 will change as different thickness pecans are being shelled in the overall process. The rubber coated cylinders 28 serve two purposes: 1) to pass unaffected whole, uncracked pecans; and 2) to further break the shell of substantially whole partially cracked pecans and large sticktights.

Whole, uncracked pecans are passed unaffected, and substantially whole cracked pecans and large sticktights are further broken by the cylinders 28. After passing the rubber coated cylinders 28, the pecan parts fall to the level one slot 30. The level one slot 30 is formed by two parallel rotating cylinders 32. These rotating cylinders, as measured between them, are rotating substantially opposite the pull of gravity. The rotating cylinders 32 are sloped toward product end 34 of the device. The product end 34 is at the sheller end of the bypass. Pecan parts that have passed the rubber coated cylinders 28 are applied to the level one slot 30 created by the rotating cylinders 32. Pecan parts that have thickness less than the width of the slot 30 will fall through the slot 30.

If the pecan parts have a thickness greater than the slot 30, gravity forces the pecan parts off the product end 34 of the rotating cylinders 32. Pecan parts that fall off the product end 34 of the rotating cylinders 32 represent whole uncracked pecans and substantially whole cracked pecans that were not further cracked by the rubber coated cylinders 28. Everything that falls off the product end 34 of the rotating cylinders 32 is returned to the cracker to be recracked. Those pecan parts that fall through the level one slot 30 are re-fed to the bypass.

Those pecan parts that fall through the level one screen 12 are further separated by width by the levels two, three, four, and five screens. The hole diameter in the level two screen 14 is sized to not allow meat halves to pass the screen. By operation of the vibrating motor 10 and the leaf springs 8, the meat halves separated by the level two screen 14 are forced toward the product end 34 of the device. A level two chute 36 directs the meat halves to a level two slot 38 in the thickness separating assembly 4. It will be understood that the meat halves separated by the level two screen may be either sticktights or sticktight free; therefore, the sticktights and sticktight free meat halves are applied to the level two slot 38 formed by counter-rotating cylinders 40. Similar to the cylinders 32 of the level one slot 30, the cylinders 40 of the level two slot 38 rotate substantially upward as measured between them in relation to gravity. The level two slot 38 then separates sticktight free meat halves, and shells of substantially the same size, from sticktight meat halves by thickness. The sticktight free meat halves and shells fall through the level two slot 38, while the sticktight meat halves slide down the cylinders 40 and fall off the product end 34. Those sticktight meat halves that fall off the product end 34 are fed to the sheller 86 of the prior art. The sticktight free meat halves and shells bypass the sheller of the prior art and go directly to an air separation 90 of the prior art.

The level three screen 16 of the width separating assembly 2 operates in conjunction with a level three chute 42 and a level three slot 44 formed by counter-rotating cylinders 46. The level three chute separates extra large meat parts from the remaining pecan product. By duplicate explanation of the level two screen separating and slot process, extra large sticktight free meat parts and shells of substantially the same size are separated from extra large sticktight meat parts by applying them to the level three slot 44 which effectively separates them by thickness. Just as on the level two separation process, the extra large meat parts that do not fall through the slot are sent to the sheller 86 of the prior art, while those extra large meat parts that do fall through the slot represent sticktight free extra large meat parts, and shells of substantially the same size, that are separated by air separator 92 of the prior art.

The level four screen 18 separates large pecan parts and feeds them to a level four chute 48 which directs them to a level four slot 50 formed by counter-rotating cylinders 52 as previously described for the other levels. From the cylinders 52, the parts are handled similarly as above.

The level five screen 20 separates medium, small and midgets pecan parts from the remaining pecan parts. The pecan parts are fed by a level five chute 54 to width screen 88 of the prior art. The width screen 88 then feeds the parts to the appropriate air separation units. Everything that falls through the holes of the level five screen 20 is considered dust and is thrown away.

The motor 10 has an eccentric weight on its shaft to produce vibration.

Figure 3:
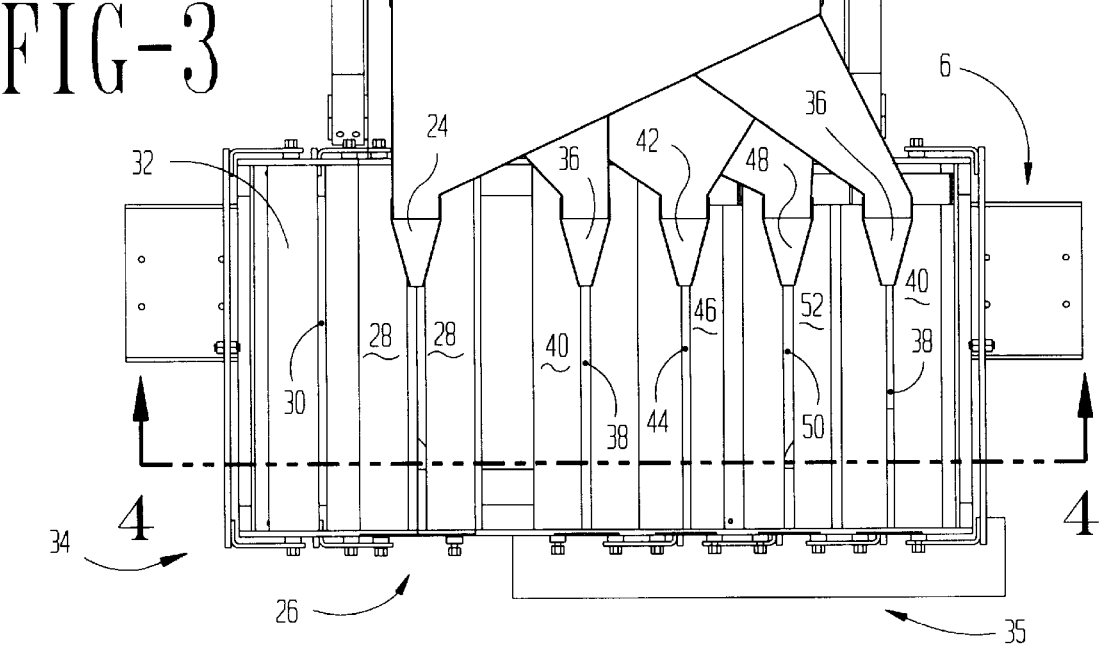
FIG. 3 is a top plan view of the thickness separating assemble of FIG. 1.
Figure 4:
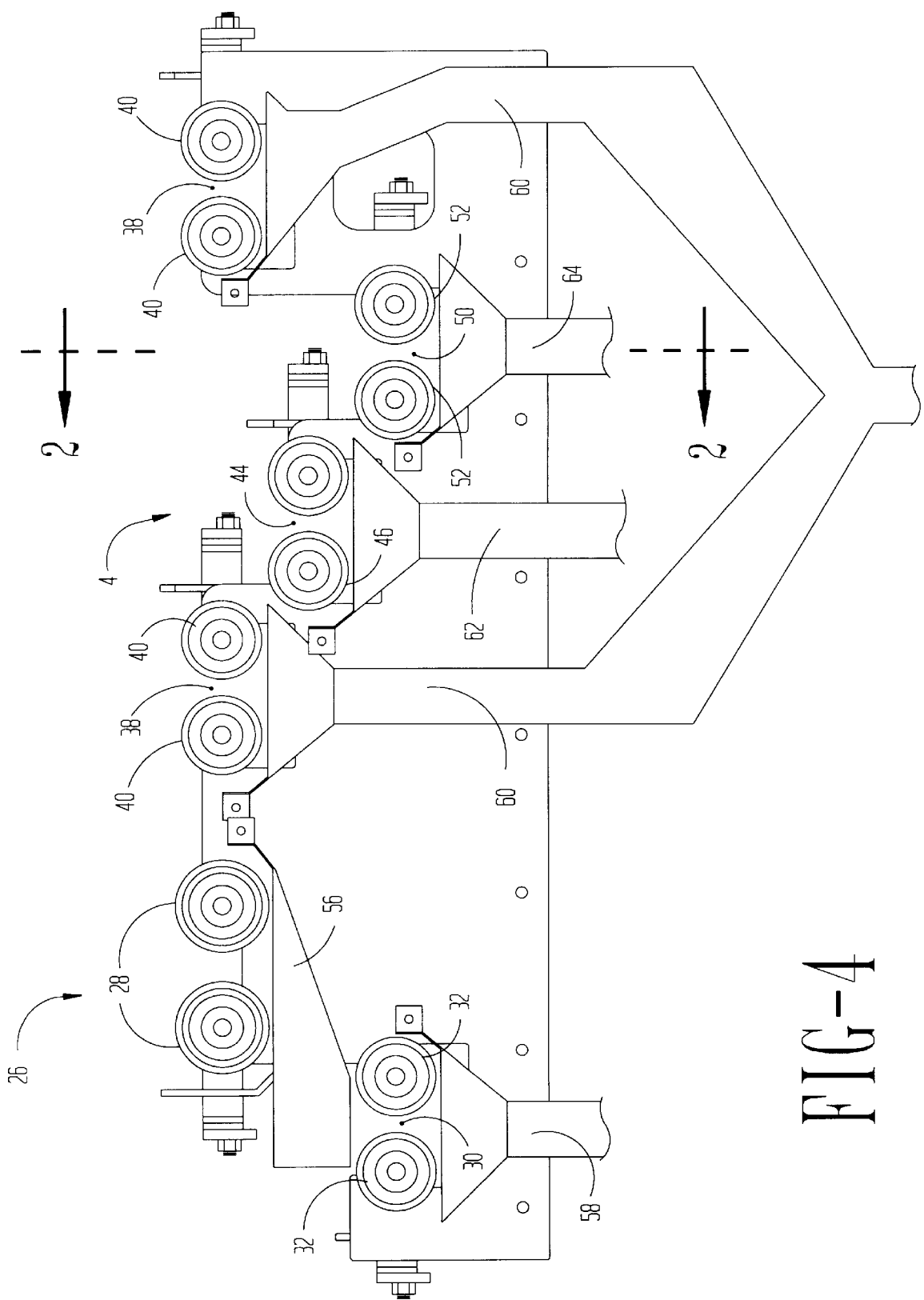
FIG. 4 is a sectional view taken substantially on line 4.4 of FIG. 3.
Figure 6:
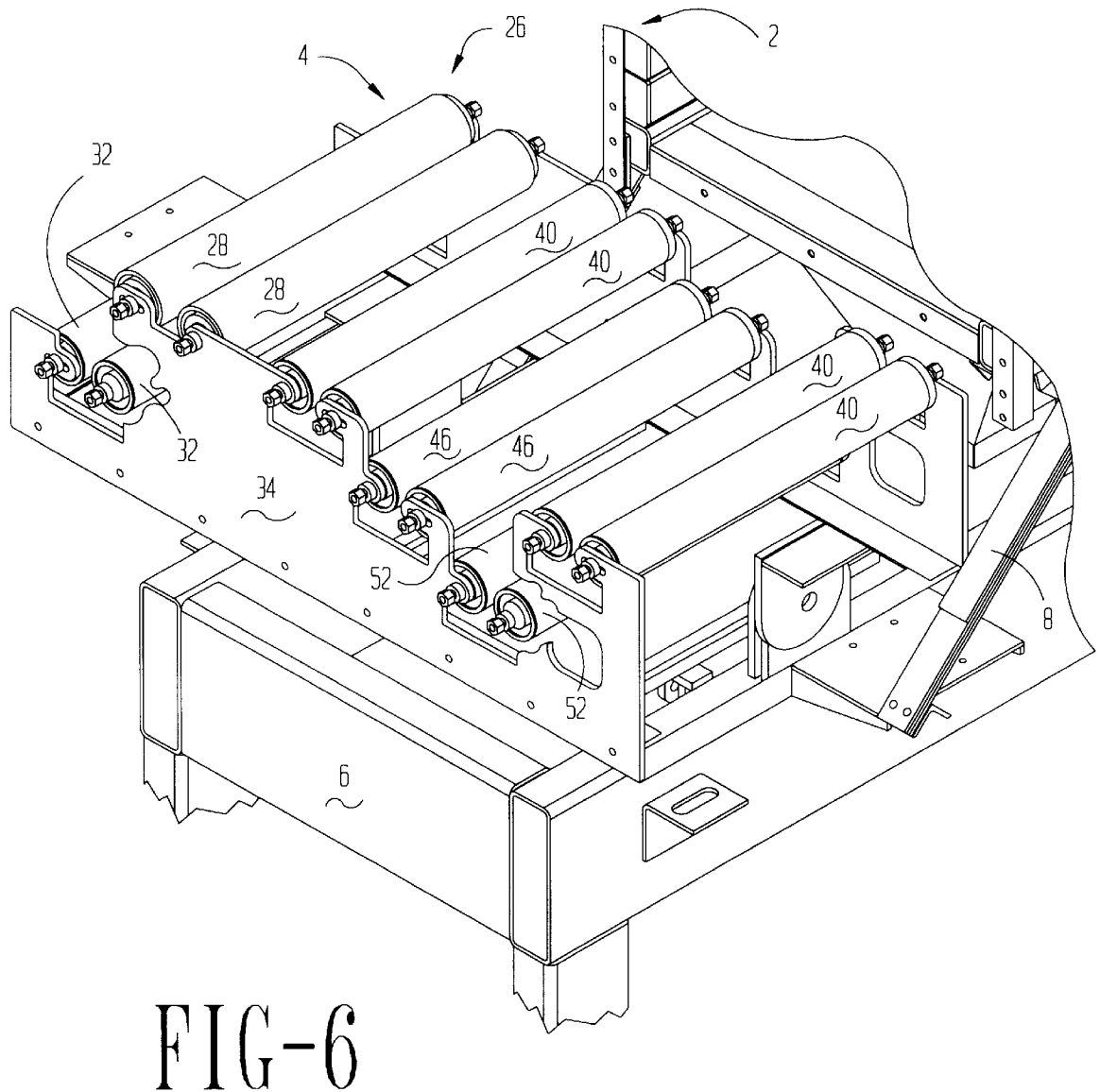
FIG. 6 is an enlarged perspective view of the thickness separator assembly of FIG. 1.
Figure 7:
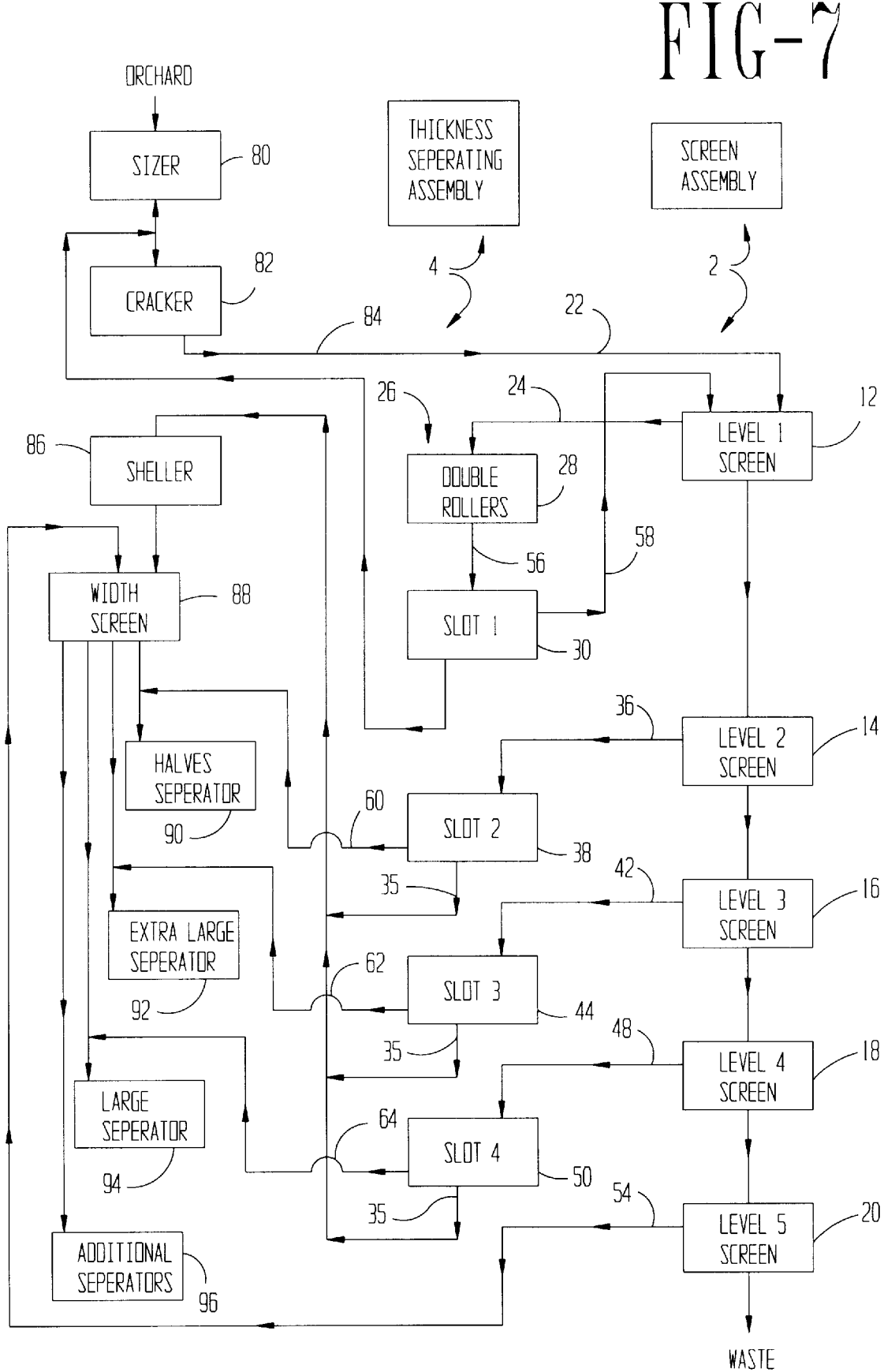
FIG. 7 is a flow diagram of the process of this invention.

Pan 35 (FIGS. 2 and 3) collect the product which falls from the end of the slots 38, 44, and 50. This product is conveyed from the product end to the sheller 86 as described above. Pan 56 collects the product from the rubber rollers 28 and conveys it to the level one slot 30. Pan 58 collects the product which falls through the slot 30 so that it may be conveyed back to the chute 22 to go through the level one screen 12. Pan 60 collects the parts which fall through the level two slot 38 and conveys them to the halves air separator 90. Likewise the pan 62 for level three slot conveys the parts to extra large separator 92. Pan 64 collects from level four slot 50 and conveys them to large separator 94. Level five screen chute 54 conveys the product to the width screen separator 88 of the plant to be directed to additional separators 96.

FIG. 1 illustrates an unidentified cover over the two rubber coated rollers 28.

The above explanation is a generic description of the pecan by-pass of this invention. As an example, the following screen sizes were used with a number 15 pecan size, i.e. $15/16$" whole pecan thickness. The level one screen 12 had a hole diameter of $11/16$". The level two screen 14 had a hole diameter of $9/16$". The level three screen had a hole diameter of $7/16$". The level four screen had a hole diameter of $6/16$". The level five screen had a hole diameter of $2/16$". These screens were sized to sort whole uncracked and substantially whole cracked, meat halves, extra large meat, large meat, medium, small and midget respectively.

The slot widths between the rollers are less than the hole size of the screens from which they are fed. The slot width may be adjusted as needed for each batch of nuts processed. The rollers tilt downward from the screen to the product end. The thickness separating assembly 4 may be rotated about axis 66 to adjust the downward angle which will usually be between 10° and 30°.

The embodiment shown and described above is only exemplary. I do not claim to have invented all the parts, elements or steps described. Various modifications can be made in the construction, material, arrangement, and operation, and still be within the scope of my invention.

For example, the belt drive mechanism to rotate the various cylinders has not been described in detail in as much as those having ordinary skill in the art will readily understand how to rotate the cylinders by intertwined belt. Also, as discussed, the width of the slots between the cylinders is adjusted. The provisions for manual adjustment of the width of the spacing between the cylinders of a pair or the remote adjustment of the spacing between the cylinders of a pair will be readily apparent to those with skill in the art.

Also although the invention has been described as pertaining to pecans, those skilled in the art will understand that the invention also pertains to other nuts, for example, walnuts.

Likewise, the mounting of different sized screens within the screen assembly will be known. Also different type assemblies might be used such as linear outlay with the smallest holes first. Also, the holes in the screens are described as circular, but those with ordinary skill in the art will understand that hexagonal holes would also be operable and perhaps in the smaller size even square holes would work equally well.

The restrictive description and drawings of the specific examples above do not point out what an infringement of this patent would be, but are to enable one skilled in the art to make and use the invention. The limits of the invention and the bounds of the patent protection are measured by and defined in the following claims.

I claim as my invention:

1. In a method of processing nuts characterized in that in each variety the ratio of the nut's thickness to its length and width is substantially constant including a) sorting nuts from an orchard by thickness into thickness ranges, b) forming cracker product by cracking nuts of a particular thickness range, an improved method of processing the cracker product comprising the further steps of:

c) sorting the cracker product by width into width ranges, then d) sorting the cracker product having a particular width range by thickness into a thicker range having sticktight meat and a thinner range having sticktight free meat.

2. The method as defined in claim 1 wherein e) the cracker product is sorted by width into width ranges by dropping smaller width cracker product through holes in a series of vibrating screens.

3. The method as defined in claim 2 wherein f) the cracker product is sorted by thickness ranges by dropping thinner cracker product through a slot.

4. The method as defined in claim 3 wherein g) said slot is the space between parallel revolving cylinders.

5. The method as defined in claim 1 further comprising e) shelling the thicker range, and f) air separating the thinner range.

6. The method as defined in claim 1 wherein the nuts are pecans.

7. In a method of processing pecans including:

a) sorting pecans from an orchard by thickness into thickness ranges, b) forming cracker product by cracking pecans of a particular thickness range, an improved method of processing the cracker product comprising the further steps of:

c) sorting the cracker product by width into width ranges, d) feeding said cracker product having the largest width range through counter rotating rubber coated cylinders, thereby i) passing unaffected whole uncracked pecans, and ii) further cracking substantially whole partially cracked pecans and large sticktights, then e) sorting the product from the rubber cylinders into a thicker range having uncracked pecans and a thinner range having all the product from the rubber cylinders except uncracked pecans.

8. The method as defined in claim 7 further comprising f) passing the thicker range having uncracked pecans to the feed of step (b), and g) passing the thinner range to the feed of step (c).

9. In a method of processing pecans including:

a) sorting pecans from an orchard by thickness into thickness ranges, b) forming cracker product by cracking pecans of a particular thickness range, a improved method of processing the cracker product comprising the further steps of:

c) sorting the cracker product by width into width ranges, d) separating a largest width range having a width of whole uncracked pecans as a first width range stream, e) separating a width range having a width of sticktight meat halves as a second width range stream, f) separating a width range having a width of sticktight extra large meat parts as a third width range stream, g) separating a width range having a width of sticktight large meat parts as a fourth width range stream, h) separating a width range having a width of sticktight medium, smalls, and midgets as a fifth width range stream, and i) separating a dust width range as a final stream, j) separating whole uncracked pecans from the first width range stream, then k) sorting each of the second, third, fourth, and fifth widths ranges streams by thickness into a thinner range and a thicker range, then l) air separating meat from shells of the thinner range of each of the second, third, fourth, and fifth stream, and m) shelling the thicker range of each of the second, third, fourth, and fifth stream.

\* \* \* \* \*